United States Patent
Kogane et al.

(10) Patent No.: US 7,028,328 B2
(45) Date of Patent: Apr. 11, 2006

(54) NETWORK SURVEILLANCE VIDEO CAMERA SYSTEM

(75) Inventors: Haruo Kogane, Kawasaki (JP); Manabu Nakamura, Yokohama (JP); Mamoru Higashimura, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 732 days.

(21) Appl. No.: 09/933,679

(22) Filed: Aug. 22, 2001

(65) Prior Publication Data

US 2001/0056579 A1    Dec. 27, 2001

Related U.S. Application Data

(62) Division of application No. 09/389,234, filed on Sep. 3, 1999, now Pat. No. 6,323,897.

(30) Foreign Application Priority Data

Sep. 4, 1998   (JP) ................................ 10-265783

(51) Int. Cl.
   *H04N 7/173*   (2006.01)
(52) U.S. Cl. ........................ 725/105; 348/143; 348/152
(58) Field of Classification Search ................ 725/105; 348/143, 148, 152, 159, 211.5; 382/100; 396/427; 370/389
   See application file for complete search history.

(56) References Cited

U.S. PATENT DOCUMENTS

| | | | |
|---|---|---|---|
| 4,249,207 A | * | 2/1981 | Harman et al. ............. 348/152 |
| 4,777,526 A | | 10/1988 | Saitoh et al. |
| 4,814,869 A | * | 3/1989 | Oliver, Jr. .................... 348/159 |
| 4,945,367 A | * | 7/1990 | Blackshear .................. 348/143 |
| 5,091,780 A | * | 2/1992 | Pomerleau ................... 348/152 |
| 5,479,206 A | * | 12/1995 | Ueno et al. .................. 348/143 |
| 5,671,009 A | | 9/1997 | Chun |
| 5,680,123 A | * | 10/1997 | Lee ............................. 348/149 |

(Continued)

FOREIGN PATENT DOCUMENTS

EP          0781049         6/1997

(Continued)

*Primary Examiner*—Allen Wong
(74) *Attorney, Agent, or Firm*—Connolly Bove Lodge & Hutz LLP (57) ABSTRACT

Monitor camera units, a data storing unit, a control server, and a monitor display are coupled by a network. The monitor camera unit includes a motion detector for detecting motion from video data, a microphone, a traffic monitor, a memory for storing the video data, and a sensor signal input circuit. The traffic monitor monitors the traffic of the network. If the traffic is high, only necessary data or sound data is transmitted. The memory stores the video data in response to the motion detector and a thinning circuit thins the video data from the memory in response to a sensor signal. The control server receives the alarm data from the monitor camera and further receives the alarm type data, time data, position data of a pivoting unit for pivoting the camera unit and transmits the data to the display terminal. In the presence of a loud sound, alarm data is also generated but it is not sent if a switch is OFF. The control server includes a data base storing set of alarm data. If an operator judges one set of alarm data is an error, the set of data is not erased but mark data is correspondingly stored to inhibit searching the set of data. During the night, the exposure and transmitting intervals are increased to prevent the same data from being transmitted twice.

5 Claims, 6 Drawing Sheets

U.S. PATENT DOCUMENTS

| | | |
|---|---|---|
| 5,745,167 A | 4/1998 | Kageyu et al. |
| 5,774,569 A * | 6/1998 | Waldenmaier ............... 348/149 |
| 5,923,364 A * | 7/1999 | Rhodes et al. ............... 346/159 |
| 5,995,139 A * | 11/1999 | Lee ............................ 348/155 |
| 6,021,120 A * | 2/2000 | Beyda et al. ............... 370/282 |
| 6,295,293 B1 * | 9/2001 | Tonnby et al. ............... 370/389 |

FOREIGN PATENT DOCUMENTS

| | | |
|---|---|---|
| EP | 0804 031 | 10/1997 |
| FR | 2704379 | 10/1994 |
| JP | 7-288806 | 10/1995 |
| JP | 9-16685 | 1/1997 |

* cited by examiner

NETWORK SURVEILLANCE VIDEO CAMERA SYSTEM

CROSS REFERENCE TO RELATED APPLICATION

The present application is a divisional of U.S. patent application Ser. No. 09/389,234, filed Sep. 3, 1999, now U.S Pat. No. 6,323,897.

BACKGROUND OF THE INVENTION

1. Field of the Invention

This invention relates to a network surveillance video camera system using a network.

2. Description of the Prior Art

A network surveillance video camera system using a network for monitoring a remote image with a video camera and a display monitor is known.

Japanese patent application provisional publication No. 9-16685 discloses a remote monitor system using a data link ISDN. Japanese patent application provisional publication No. 7-288806 discloses that a traffic amount is measured and the resolution is determined in accordance with the traffic amount. U.S. Pat. No. 5,745,167 discloses a video monitor system including a transmitting medium, video cameras, monitors, a VTR, and a control portion.

SUMMARY OF THE INVENTION

The aim of the present invention is to provide a superior network surveillance video camera system.

According to the present invention there is provided a network surveillance video camera system using a network including: a plurality of video camera units, each having a different address and generating video data, each including a motion detector for detecting a motion of an image from the video data and a communication circuit for communicating with the network to transmit the video data and an output of the motion detector; a data storing terminal, having a different address and a communication circuit for communicating with the network, for receiving and storing the video data from the video camera units through the network; a display terminal, having a different address and a communication circuit for communicating with the network, for displaying the video data from the data storing terminal and the video camera units; and a control server coupled to the network having a different address for automatically communicating with the network to control the addresses of the video camera units, the data storing terminal, and the display terminal.

In the network surveillance video camera system, at least one of the video camera units may further include a memory for storing the video data and a traffic detector for detecting a traffic amount of the network, comparing the traffic amount with a reference, and transmitting, to the display terminal, only a portion of the video data regarding that the motion detector detects the motion when the traffic amount exceeds the reference.

In the network surveillance video camera system, at least one of the video camera units may further include a microphone for generating sound data and a traffic detector for detecting a traffic amount of the network, comparing the traffic amount with a reference, and transmitting the sound data to the display terminal as well as inhibiting to transmit the video data when the traffic amount exceeds the reference. The display terminal may further include a speaker for reproducing the sound data.

In the network surveillance video camera system, at least one of the video camera units may further include a memory for storing the video data in response to the motion detector, a sensor input circuit for receiving a sensor signal, and a thinning circuit for thinning the video data in the memory to transmit the thinned video data to the network.

In the network surveillance video camera system, each of the video camera units may include: a sensor input circuit for receiving a sensor signal; and an alarm signal generation circuit for generating alarm data in response to the sensor signal and the motion detector to transmit the alarm data and data regarding the alarm data including the sensor signal to the control server. The control server may further include: a data base for storing sets of the alarm data and the data regarding the alarm data; an input circuit for inputting keyword data and mark data; a searching circuit for searching the alarm data in the data base in accordance with the keyword; and a data base control circuit for storing the mark data in response to the input circuit with correspondence with one of the sets of the alarm data to inhibit searching circuit from searching the one of the sets of alarm data corresponding to the mark data.

In the network surveillance video camera system, each of the video camera units may further include: a pivoting unit for changing an optical axis of the video camera unit in accordance with control data; and a position data generation circuit for generating position data of the pivoting unit; a time data generation circuit for generating time data; an alarming circuit responsive to a sensor signal and the motion detector for generating alarm data and alarm type data and transmitting the alarm data, the alarm type data, alarm sub-data including the position data and the time data, and the address of the video camera unit. The control server may further include: a table storing relation between addresses of the video camera units and data of installation places of the video camera units; and a control circuit for receiving the alarm data from one of the video camera units, obtaining the position data and the data of installation place of the one of video camera units which transmits the alarm data and transmitting the alarm data, the alarm type data, the data of installation place of the one of the video camera units, and alarm sub-data including the position data and the time data, and the address of the one of video camera units to the display terminal.

In the network surveillance video camera system, at least one of the video camera units may further include a microphone for receiving a sound signal around each video camera unit and generating sound data from the sound signal, a comparator for comparing a level of the sound data with a reference, an alarm circuit for generating alarm data when the level exceeds the reference, and a switch for either transmitting the alarm data or not transmitting the alarm data to the network.

In the network surveillance video camera system, at least one of the video camera units may include a CCD imager for successively generating the video data with an exposure interval and a brightness level detector for detecting a brightness level, and an exposure control circuit for changing the exposure interval from a first exposure interval to a second exposure interval which is longer than the first exposure interval and for changing a transmitting interval of the video data from a first interval to a second interval which is longer than the first interval to prevent the video camera unit from transmitting the same field or frame of video data twice, when the brightness level is less than the reference brightness level.

In the network surveillance video camera system, the control server may generate an address table of the plurality of video camera units and transmit the address table to the data storing terminal. The data storing terminal may further include a memory for receiving and storing the address table and a monitoring circuit for monitoring the network to receive and store the video data from the video camera units within the network surveillance video camera system.

In the network surveillance video camera system, the control server may generate an address table of the plurality of video camera units and transmit the address table to the display terminal. The display terminal may further include a memory for receiving and storing the address table and a monitoring circuit for monitoring the network to receive and display the video data from the video camera units within the network surveillance video camera system.

BRIEF DESCRIPTION OF THE DRAWINGS

The object and features of the present invention will become more readily apparent from the following detailed description taken in connection with the accompanying drawings in which.

The same or corresponding elements or parts are designated with like references throughout the drawings.

DETAILED DESCRIPTION OF THE INVENTION

Hereinbelow will be described an embodiment of this invention.

Figure 1:
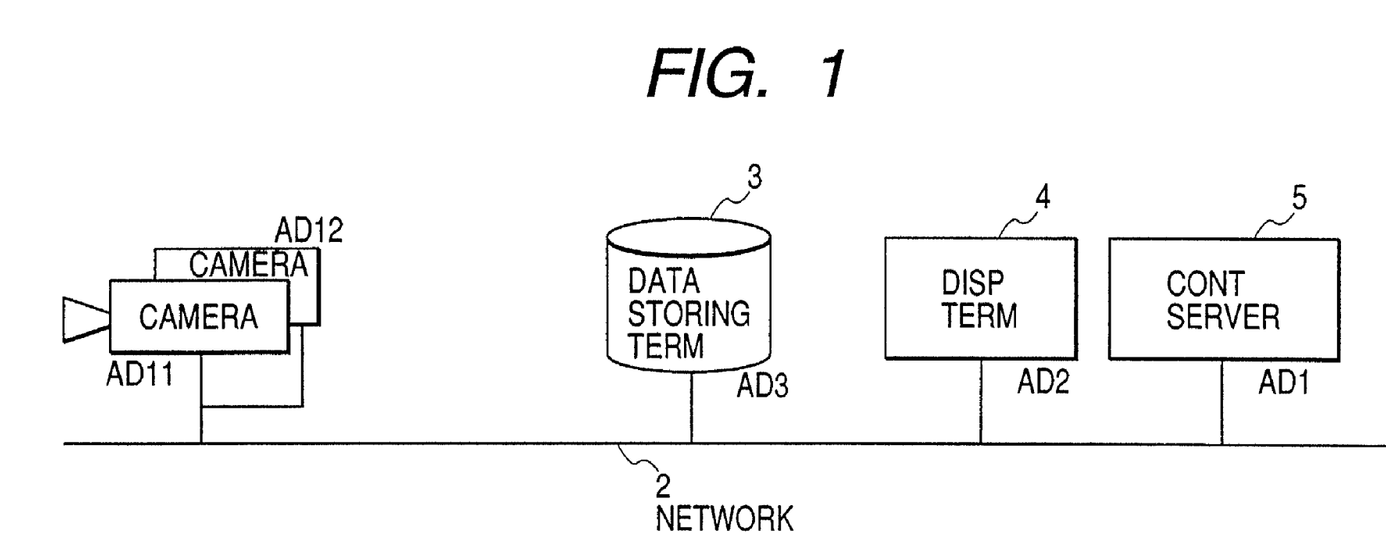
FIG. 1 is a block diagram of a network surveillance video camera system of an embodiment of this invention.
Figure 2:
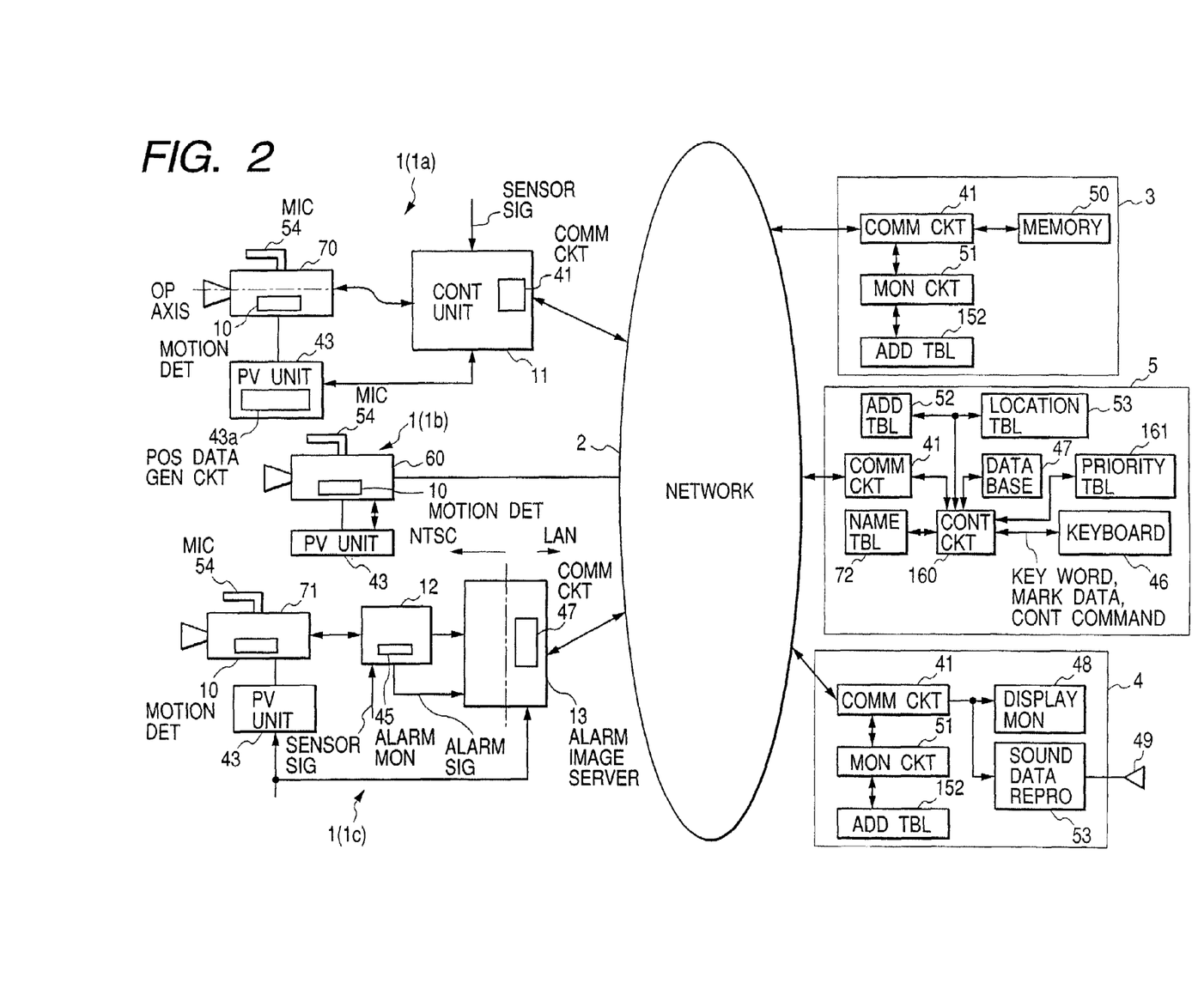
FIG. 2 is a detailed block diagram of the network surveillance video camera system shown in FIG. 1.

FIG. 1 is a block diagram of a network surveillance video camera system of the embodiment of this invention. FIG. 2 is a detailed block diagram of the network surveillance video camera system shown in FIG. 1.

The network surveillance video camera system of this embodiment includes a plurality of camera units 1 having different (unique) addresses AD11, AD12, . . . , a data storing terminal 3 having an address AD3, a display terminal having an address AD2, and a control server 5 having an address AD1 which are coupled to each other through a network 2.

As shown in FIG. 2, different type of camera units 1a, 1b, and 1c are coupled to the network 2. Each of camera units 1 includes a pivoting unit 43 for pivoting a video camera 70 (an optical axis of the video camera) in accordance with position command data (control data) from the control server 5 and a motion detection circuit 10 for detecting motion in an image from the detected images between consecutive frames. Moreover, microphones 54 are provided to respective camera units 1. However, the pivoting unit 43 or the microphone 54 can be occasionally omitted.

Figure 3:
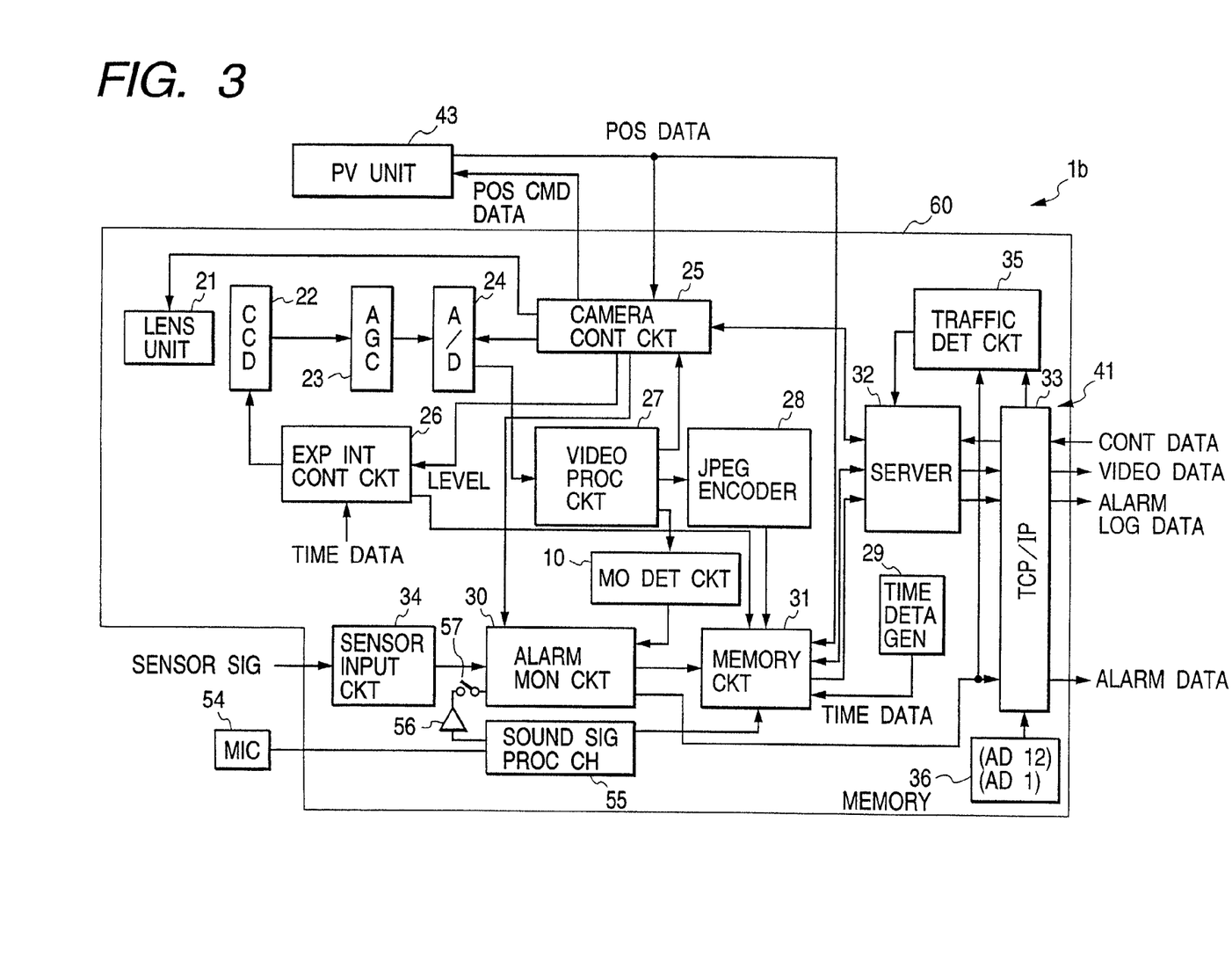
FIG. 3 is a block diagram of the video camera unit shown in FIG. 1.

FIG. 3 is a block diagram of the camera unit 1b shown in FIG. 1. The camera unit 1b includes a video camera 60 and a pivoting unit 43. In the video camera 60, a lens unit 21 receives an image around the video camera 60 and forms the image on a CCD imager 22 of which exposure interval is controlled by an exposure interval control circuit 26. An AGC circuit 23 amplifies the video signal from the CCD imager 22 with the gain controlled. An a/d converter 24 converts the video signal from the AGC circuit 23 to digital video data supplied to a video processing circuit 27. A camera control circuit 25 controls the lens unit 21 in accordance with the video data and control data from the control server 5. The camera control circuit 25 further controls the pivoting unit 43 in accordance with control data from the control server 5. A position data generation circuit 43a in the pivoting unit 43 generates position data including pan position data and tilt position data which is supplied to the camera control circuit 25 and to a memory 31 to send it to the control server 5. The video data from the video processing circuit 27 is supplied to a JPEG encoder 28 for encoding the video data into encoded video signal with compression and supplied to a motion detection circuit 10. The encoded video data is supplied to the memory 31 to store the encoded video data. The memory 31 is further supplied with alarm data from an alarm monitoring circuit 30, the position data from the pivoting unit 43, and time data from a time data generation circuit 29.

The alarm monitor circuit 30 is supplied with sensor signals from sensor input circuit 34, an output of the camera control circuit 25, a motion detection signal from a motion detection circuit 10. When the motion detection circuit 10 detects motion in the video data between consecutive frames, the alarm monitoring circuit 30 generates alarm data to transmit the alarm data to the control server 5 through a TCP/IP (transmission control protocol/internet protocol) circuit 33. Moreover, when any of sensor signals is inputted to the sensor input circuit 34, the alarm monitoring circuit 30 generates the alarm data to transmit the alarm data to the control server 5 through a TCP/IP circuit 33. On the other hand, alarm log data (sub-alarm data) including the alarm data, alarm type data, and the image of the video data regarding the alarm, the position data, and time data are stored in the memory 31 and transmit to the control server 5 through the sever 32 and the TCP/IP circuit 33.

The camera unit 1b further includes a memory 36 storing the address AD1 of the control server 5, its own address AD12, and an address table transmitted from the control server 5. When the camera unit 1b is coupled to the network 2, the camera unit 1b communicates with the control server 5 to receive its own address AD12 and the address AD1 of the control server 5 or the control server broadcasts a request for response to assign addresses when power-on. The camera control circuit 25 receives the control data for the pivoting unit 43 and lens unit 21 and an exposure interval control circuit 26 using its own address AD12 as a destination and the address AD1 of the control server 5 as a source.

The camera unit 1b further includes the microphone 54 for receiving a sound signal around the microphone 54 and supplying the sound signal to a sound signal processing circuit 55 which process the sound signal to generate sound data supplied to the memory 31 to store the sound data.

The camera unit 1b further includes a traffic detection circuit 35 responsive to the TCP/IP circuit 33 and the alarm monitor circuit 30 for detecting traffic of the network 2. When the amount of traffic is greater than a reference value, the traffic detection circuit 35 controls the server 32 to transmit only the necessary image of the video data regarding the alarm from the memory 31. That is, when the amount of traffic is greater than the reference value, the server 32 transmits the video data from the memory 31 when there is any of sensor signals or the motion detection signal to the network 2. When the amount of traffic is less than the reference value, the traffic detection circuit 35 controls the server 32 to successively transmit the image of the video data. Moreover, in the normal condition, the sound data is transmitted with the video data substantially at the same time. However, if the amount of the traffic is greater than the reference value, the traffic detection circuit 35 may control the server 32 to transmit only the sound data and to inhibit transmission of the video data. On the other hand, the alarm data is separately transmitted by the TCP/IP circuit 33. Then, the control server 5 and the display terminal 4 are immediately supplied with the alarm data and image of the video data regarding the alarm. Then, the control server 5 increases the priority of the video camera transmitting the alarm data to suppress communication by other units coupled to the network to reduce the traffic. This provides successively transmitting the video data from the camera unit 1 transmitting the alarm to the display terminal 4.

The camera unit 1b further includes a comparator 56 and a switch 57. The comparator 56 compares the sound level of the sound data with a reference sound value. When the sound level is greater than the reference sound value, the alarm monitor circuit 30 generates the alarm data to transmit the alarm data to the network 2 if the switch 57 is closed. If the switch 57 is open, the alarm data indicative of the presence of a loud sound is not generated.

Figure 4:
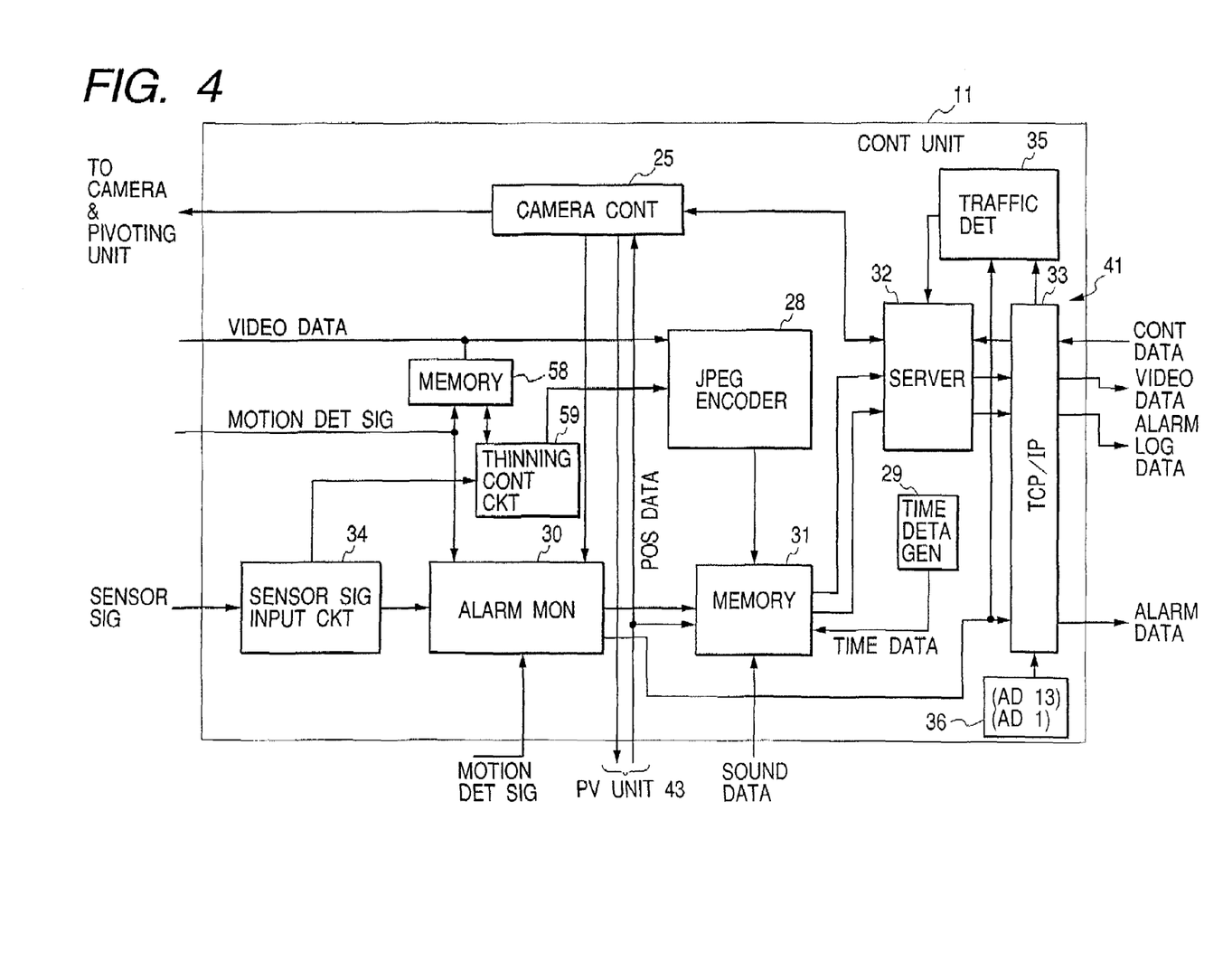
FIG. 4 is a block diagram of a control unit of this embodiment shown in FIG. 2.

FIG. 4 is a block diagram of the control unit 11 of this embodiment. The control unit 1 includes substantially the same circuits as the video camera 1b except the lens unit 21, the CCD imager 22, the AGC circuit 23, the a/d converter 34, and the video processing circuit 27. Moreover, the control unit 11 further includes a memory 58 for storing the video data and a thinning control circuit 59 for thinning the video data. The memory 58 stores the video data from the camera 70 in response to the motion detection signal from the motion detection circuit 10 in the camera 70. The thinning circuit 59 thins the video data in response to one of the sensor signals from the sensor signal input circuit 34. The thinning control circuit 59 generates thinned video signal by processing such that a size of aperture is changed. That is, a size of a block (pixel) unit of the video signal is enlarged, so that the JPEG encoder generates a lower amount of video data by compression.

The video signal and a motion detection signal from the camera 71 are supplied to a control box 12 which further receives sensor signals. The control box 12 includes an alarm monitor circuit 45 for generating alarm data in response to the motion detection signal and sensor signals. The video signal and the alarm data is supplied to an alarm image sever 13 which temporally stores the video signal and immediately transmits the alarm data to the network 2.

Figure 5:
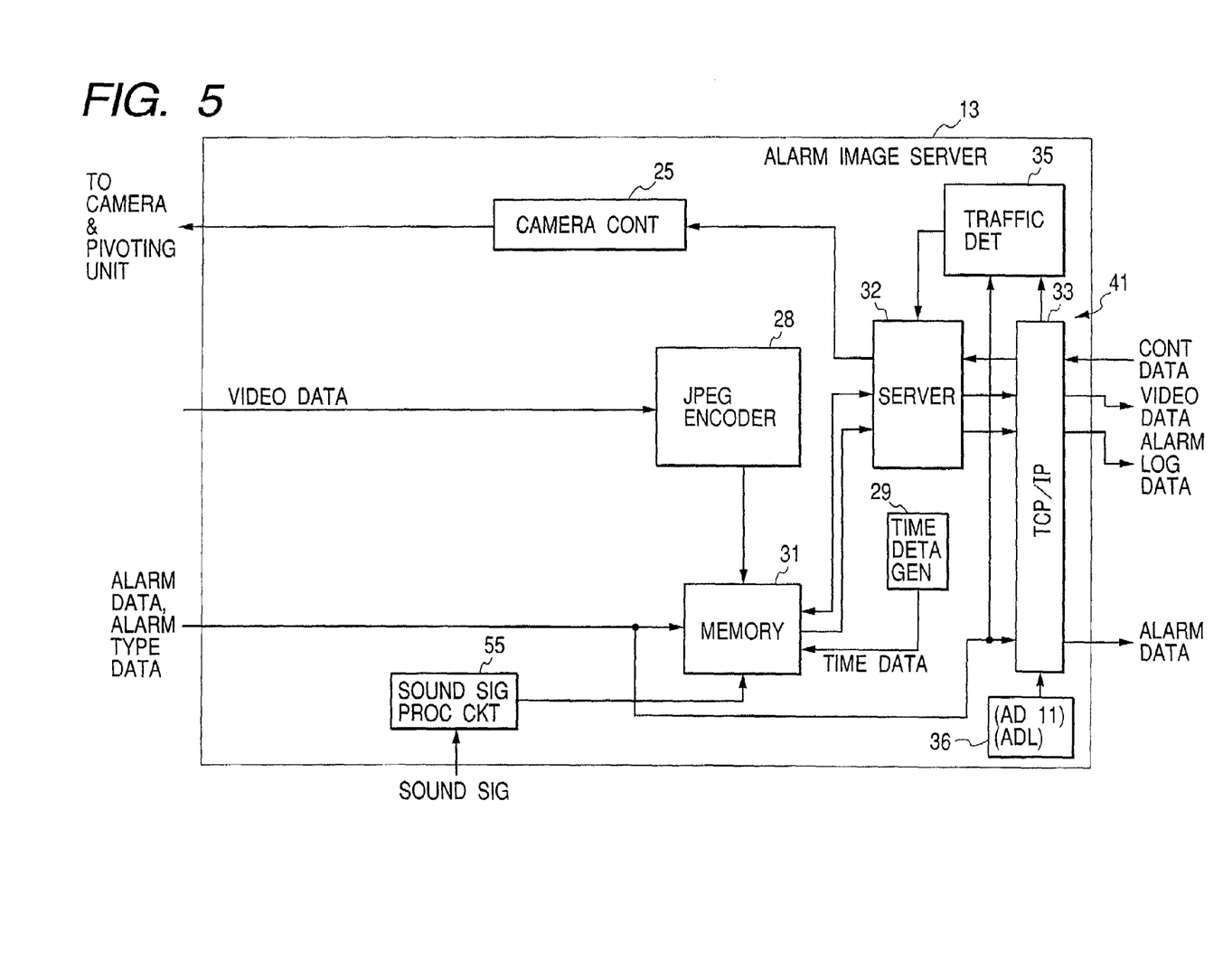
FIG. 5 is a block diagram of the alarm image server of this embodiment shown in FIG. 2.

FIG. 5 is a block diagram of the alarm image server 13 of this embodiment. The alarm image server 13 includes substantially the same circuits as the video camera 1b except the lens unit 21, the CCD imager 22, the AGC circuit 23, the a/d converter 24, and the video processing circuit 27. Moreover, the alarm image server 13 temporally stores the video data obtained from the video signal from the video camera 71 through the control box 12 and transmits the video data from the memory 31 with observing the traffic of the network 2.

The control server 5 includes a communication circuit 41, a control circuit 160, an address table 52, a location table 53, a data base 47, a priority table 161 and a keyboard 46. When the control server 5 receives a request for assigning an address from one of camera units 1, the control server 5 assigns an address for the camera unit 1 and generates the address table 52 in response to a request from one of camera units 1. If another camera unit 1 transmits the request for assigning the address to the control server 5, the control server assigns the address and renews the address table 52. The control server transmits the address table to the data storing terminal 4 and the display terminal 4 to provide address table 152 in the data storing terminal 3 and the display terminal 4.

The control server 5 further includes a location table 53 indicative of relation between the addresses of the camera units 1 and the locations where the camera units 1 are installed. The control server 5 further includes a data base for storing sets of the video data from the camera units 1 at occurrence of the alarm data and the alarm type data, and the time data, the position data of the pivoting unit 43, the address data, and the location data of the camera unit 1. The control server 5 receives a keyword from a keyboard 46 to search the corresponding set of data in the data base 47. Moreover, if the operator judges an alarm is an error, the operator operates the keyboard 46 to store mark data with the corresponding set of data to make the set of data indicating alarming not to be searched.

When the control server 5 receives the alarm data, the control server 5 receives the alarm type data, the time data, the position data, and the address data and reads the location data from the location table 53 with the address data and transmits the alarm data, the alarm type data, the time data, the position data, the address data, and the location data to the display terminal 4 to display the data.

The control server 5 includes the priority table 161 as mentioned above, The control server 5 increases the priority of the video camera transmitting the alarm data to suppress communication by other units coupled to the network to reduce the traffic in response to the alarm data. This provides successively transmitting the video data from the camera unit 1 transmitting the alarm to the display terminal 4.

The data storing terminal 3 includes a communication circuit 41, a network monitoring circuit 51, an address table 152, and a memory 50. The network monitoring circuit 51 monitors the network 2 to search the address data of this network monitor camera system. If the address data is assigned to this network monitor camera system or assigned to the data storing terminal 3, the data storing terminal 3 stores the received data in the memory 50. If there is a request for displaying the data in the memory 50 from the control server 5, the data storing terminal 3 transmits the corresponding set of the data to the display terminal 4 using the address table 152.

The display terminal 4 includes a communication circuit 41, a network monitoring circuit 51, an address table 152, a display monitor 48, a sound data producing circuit 53, and a speaker 49. The network monitoring circuit 51 monitors the network 2 to search the address data of this network monitor camera system. If the source address data is assigned to this network monitor camera system or the destination address is the display terminal 4, the data storing terminal 3 displays the transmitted data on the display monitor 48. If the data is sound data, the sound data is reproduced by the sound data reproducing circuit 53 and the speaker 49.

In the camera unit 1b, the exposure interval control circuit 26 controls the exposure interval in accordance with the control data from the control server, a level of the video data, and time data from the time data generation circuit 29. When the luminance level of the video data is less than a reference level, the exposure interval control circuit 26 increases the exposure interval, for example, the exposure interval is made twice the normal exposure interval, so that if it is dark at the location of the video camera 1b, the sensitivity is increased. In this condition, the exposure interval control circuit 26 controls the memory 31 to transmit the video data to the network at the interval which is twice the normal transmission interval to reduce the traffic in the network 2. The exposure interval control circuit 26 may control the exposure interval in accordance with the time data from the time data generation circuit 29 because time data informs the night and day time. When it is the night time, the exposure interval control circuit 26 increases the exposure interval.

Figure 6A:
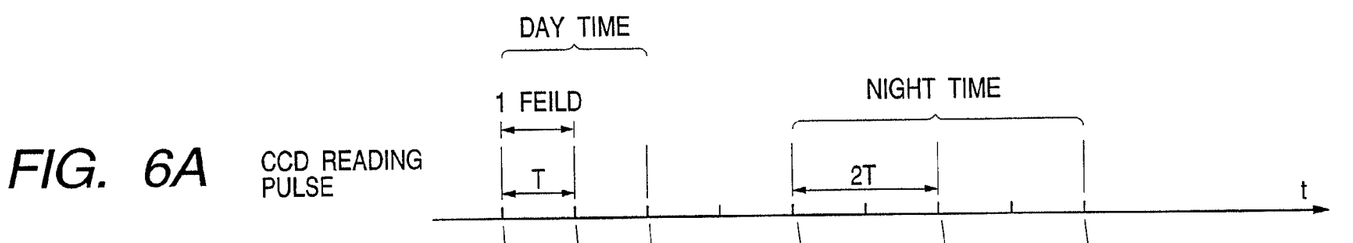
FIGS. 6A to 6C are time charts of this embodiment showing the exposure interval changing operation.
Figure 6B:
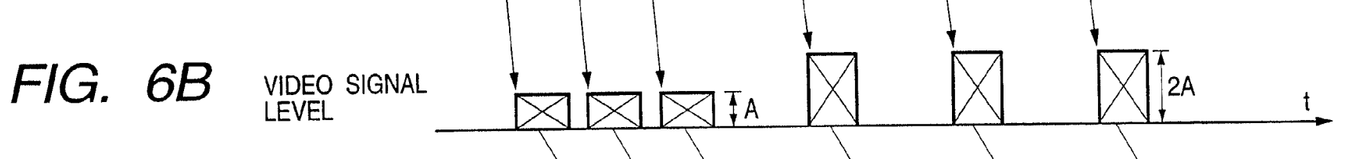
Figure 6C:
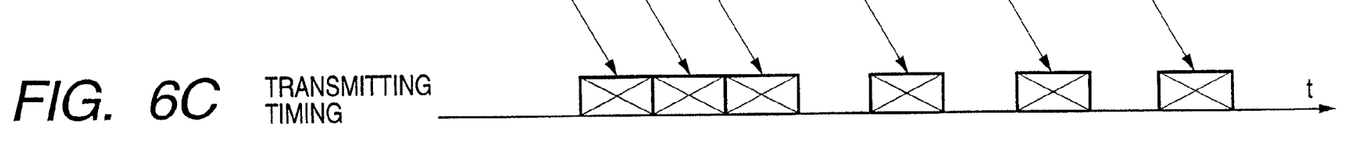

FIGS. 6A to 6C are time charts of this embodiment showing the exposure interval changing operation.

As shown in FIG. 6A, the video signal is read from the CCD imager 22 every one field at an interval T in day time. On the other hand, the video signal is read from the CCD imager 22 every one field at an interval 2T. That is the exposure time interval is T in day time and 2T in night time. Accordingly, the video signal level (2A) per unit brightness in night time is twice that (A) in day time as shown in FIG. 6B.

The control server 5 further includes a name table represents relation between addresses and names of camera units 1 to dynamically assign the physical address every power on. That is, when the control server 5 is turned on, the control server 5 broadcasts a response request. Every camera units 1, the data storing terminal 4, and the display terminal 4 responds to this and successively transmits domain names. The control server 5 assigns the physical addresses managed by the control server 5 to the camera units 1, the data storing terminal 4, and the display terminal 4. That is, the control server 5 stores the domain names with respect to physical address as the name table 72. Then, the control server 5 informs the camera units 1, the data storing terminal 4, and the display terminal 4 of the physical addresses. Then, each of camera units 1 can use both of the domain name and the physical address. As mentioned above, the data storing terminal 3 and the display terminal 4 monitors the destination address transmitted through the network and acquires the video data and other data if the address is within the network surveillance video camera system. Moreover, the operator can command which image is to be displayed. That is, the operator operates the keyboard 46 to display the image from one of the camera units 1 by inputting the domain name of the camera unit 1. Moreover, the operator can reproduce the image from the data storing terminal 3 by operating the keyboard 46.

The camera unit 1 including the microphone 54 can obtain both video and sound data and transmits the video data and sound data as follows:

The camera unit 1 generates different files of video and sound data using the network domain format and independently transmits the sound data file and the video data files to the display terminal 4. The control server 5 controls the addresses for the sound data and the video data independently every camera unit 1. That is, the control server 5 controls the addresses with domain names in appearance and internally controls the system with IP addresses dynamically assigned.

What is claimed is:

1. A network surveillance video camera system using a network comprising:
   a plurality of video camera units, each having a different address and generating video data, each including motion detection means for detecting a motion of an image from said video data and communication means for communicating with said network to transmit said video data and an output of said motion detection means; each of said video camera units including:
   sensor input means for receiving a sensor signal;
   alarm signal generation means for generating alarm data in response to said sensor signal and said motion detection means to transmit said alarm data and data regarding said alarm data including said sensor signal;
   a transmission control protocol/internet protocol circuit made to receive said video data and said alarm data, and coupled to said network for transmitting said video data and said alarm data to said network;
   storing means, having a different address and communication means for communicating with said network, for receiving and storing said video data from said video camera units through said network;
   display means, having a different address and communication means for communicating with said network, for displaying said video data from said storing means and said video camera units; and
   a control server coupled to said network having a different address for automatically communicating with said network to control said addresses of said video camera units, said storing means, and said display means.

2. A network surveillance video camera system as claimed in claim 1, wherein
   said control server further includes:
   a database for storing sets of said alarm data and said data regarding said alarm data;
   input means for inputting keyword data and mark data;
   searching means for searching said alarm data in said database in accordance with said keyword; and
   database control means for storing said mark data in response to said input means with correspondence with one of said sets of said alarm data to inhibit searching means from searching one of said sets of said alarm data corresponding to said mark data.

3. A network surveillance video camera system as claimed in claim 1, wherein each of said video camera units further includes: pivoting means for changing an optical axis of said video camera unit in accordance with control data; and position data generation means for generating position data of said pivoting means; time data generation means for generating time data; alarming means responsive to a sensor signal and said motion detection means for generating alarm data and alarm type data and transmitting said alarm data, said alarm type data, alarm sub-data including said position data and said time data, and said address of said video camera unit and said control server further includes: a table storing relation between addresses of said video camera units and data of installation places of said video camera units; and control means for receiving said alarm data from one of said video camera units, obtaining said position data and said data of installation place of said one of video camera units which transmits the alarm data, and transmitting said alarm data, said alarm type data, said data of installation place of said one of said video camera units, and alarm sub-data including said position data and said time data, and said address of said one of video camera units, to said displaying means.

4. A network surveillance video camera system as claimed in claim 1, wherein said control server generates an address table of said plurality of video camera units and transmits said address table to said storing means, said storing means further comprises storing means for receiving and storing said address table and monitoring means for monitoring said network to receive and store said video data from said video camera units within said network surveillance video camera system.

5. A network surveillance video camera system as claimed in claim 1, wherein said control server generates an address table of said plurality of video camera units and transmits said address table to said display means, said display means further comprises storing means for receiving and storing said address table and monitoring means for monitoring said network to receive and display said video data from said video camera units within said network surveillance video camera system.

\* \* \* \* \*